(12) United States Patent
Forstall et al.

(10) Patent No.: US 7,421,690 B2
(45) Date of Patent: Sep. 2, 2008

(54) THREADED PRESENTATION OF ELECTRONIC MAIL

(75) Inventors: Scott Forstall, Mountain View, CA (US); Greg Christie, San Jose, CA (US); Stephen O Lemay, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 10/602,335

(22) Filed: Jun. 23, 2003

(65) Prior Publication Data

US 2004/0260756 A1 Dec. 23, 2004

(51) Int. Cl.
G06F 9/46 (2006.01)
G06F 15/16 (2006.01)
G06F 17/00 (2006.01)
G06F 12/00 (2006.01)

(52) U.S. Cl. .................. 718/100; 709/205; 709/206; 715/234; 707/200

(58) Field of Classification Search ......... 709/203–206; 718/100–108; 715/234; 707/200
See application file for complete search history.

(56) References Cited

U.S. PATENT DOCUMENTS

| | | | | |
|---|---|---|---|---|
| 5,948,058 | A * | 9/1999 | Kudoh et al. | 709/206 |
| 6,330,589 | B1 * | 12/2001 | Kennedy | 709/206 |
| 6,442,592 | B1 * | 8/2002 | Alumbaugh et al. | 709/206 |
| 6,496,853 | B1 * | 12/2002 | Klein | 709/206 |
| 6,525,747 | B1 * | 2/2003 | Bezos | 715/751 |
| 6,631,398 | B1 * | 10/2003 | Klein | 709/206 |
| 6,700,591 | B1 * | 3/2004 | Sharpe | 715/762 |
| 6,701,346 | B1 * | 3/2004 | Klein | 709/206 |
| 6,704,772 | B1 * | 3/2004 | Ahmed et al. | 709/207 |
| 6,714,971 | B2 * | 3/2004 | Motoyama et al. | 709/219 |
| 6,745,197 | B2 * | 6/2004 | McDonald | 707/102 |
| 6,807,566 | B1 * | 10/2004 | Bates et al. | 709/206 |
| 6,832,244 | B1 * | 12/2004 | Raghunandan | 709/206 |
| 2002/0073117 | A1 * | 6/2002 | Newman | 707/513 |
| 2002/0073157 | A1 * | 6/2002 | Newman et al. | 709/206 |
| 2003/0163537 | A1 * | 8/2003 | Rohall et al. | 709/206 |
| 2003/0167310 | A1 * | 9/2003 | Moody et al. | 709/206 |

OTHER PUBLICATIONS

Venolia, Gina Danielle et al. "Understanding Sequence and Reply Relationships with Email Conversations: A Mixed-Model Visualization." ACM. Apr. 10, 2003.*

(Continued)

*Primary Examiner*—Lewis A. Bullock, Jr.
*Assistant Examiner*—Jennifer N To
(74) *Attorney, Agent, or Firm*—Fish & Richardson P.C.

(57) ABSTRACT

A threaded list of e-mail messages is provided by checking each received message against previous messages to determine whether the new message is associated with previous messages. If so, then a new thread is created. The new thread has an associated thread header, which stores metadata bout the messages in the thread. If the received message is related to messages in an existing thread, then the received message is added to that thread, and the thread header for that thread is updated to reflect data from the received message. The thread header appears with messages in a message list view of the inbox, and provides data about the thread. Messages that are not part of a thread are shown in the same view as threaded messages, without a thread header. This allows a user to view both threaded and non-threaded messages in a single view.

40 Claims, 9 Drawing Sheets

OTHER PUBLICATIONS

Kerr, Bernard. "Thread ARCS: An Email Thread Visualization." IEEE. Oct. 21, 2003.*

Lewis, David D. et al. "Threading Electronic Mail: A Preliminary Study." AT&T Labs. 1997.*

Smith, Marc A. et al. "Visualization Components for Persistent Conversations." Microsoft Research. Microsoft Corporation. Sep. 21, 2000.*

Fisher, Danyel et al. "Studies of Automated Collection of Email Records." Technical Report UCI-ISR-02-4. 2002.*

Rohall, Steven L. et al. "Email Visualization to Aid Communications." IEEE. 2001.*

Sudarsky, Sandra et al. "Visualizing Electronic Mail." Siemens Corporate Research, Inc. IEEE. 2002.* http:www2creo.com/sixdegrees; Six Degrees—timefreeing technology, "Six Degrees Weblog" CREO-Six Degrees, p. 1 of 1, visited on Jun. 30, 2003.

http://office.microsoft.com/assistance/preview.aspx?AssetID=HA010 . . . Microsoft Office Assistance, "Power tips for organizing your Outlook 2002 Inbox," Microsoft Office Online, pp. 1-3, visited on Feb. 5, 2004.

* cited by examiner

| | | In—christie@apple.com (619 unread) | | | |
|---|---|---|---|---|---|
| Compose | Delete | Reply Reply All Forward Mailboxes Get Mail Junk | | | Search "christie@ap... |

5854 messages

| | | From | Subject | Date Recieved | |
|---|---|---|---|---|---|
| △ | | adam baker | WWDC 2003 HI Lab Staffing Update | Thu, Jun 19, 2003 | 11:27 AM |
| △ | 4 | imran | remaining items for scott's WWDC slides | Thu, Jun 19, 2003 | 10:45 AM |
| | ○ | Heatehr M Snow | ice cream today 4pm! | Thu, Jun 19, 2003 | 10:24 AM |
| | ○ | Pat Coleman | [Hig] Stopping to have a root canal... | Thu, Jun 19, 2003 | 10:14 AM |
| △ | ○ 1 | Ali Ozer | Aqua blue colors | Thu, Jun 19, 2003 | 10:11 AM |
| △ | ○ 2 | Scott Forstall | Sampler icon | Thu, Jun 19, 2003 | 12:38 AM |
| △ | ○ 9 | Ken Bereskin | Keynote demo feedback | Wed, Jun 18, 2003 | 11:44 PM |
| △ | | Paul Rekieta | Menu Extra... | Wed, Jun 18, 2003 | 11:43 PM |
| | | designwithinreach@drw... | One Word: Plastic | Wed, Jun 18, 2003 | 8:57 PM |
| | | Pat Coleman | [Hig] Pat out on Friday | Wed, Jun 18, 2003 | 8:12 PM |
| | | imran | these ones crack me up | Wed, Jun 18, 2003 | 7:20 PM |
| △ | | Scott Forstall | Search | Wed, Jun 18, 2003 | 7:17 PM |
| | | imran | look—alike | Wed, Jun 18, 2003 | 7:13 PM |
| △ | | Patrick McClaughry | unable to mount iDisk disk image w... | Wed, Jun 18, 2003 | 7:10 PM | remaining items for scotts WWDC slides
Started by imran on Wednesday, June 18, 2003
4 unread, 5 total

| | imran | Re: remaining items for sco... | 6/18/03 | 10:43 PM |
|---|---|---|---|---|
| ○ | Marcel Van Os | Re: remaining items for sco... | 6/18/03 | 11:44 PM |
| ○ | Scott Forstall | Re: remaining items for sco... | 6/19/03 | 12:35 AM |
| ○ | Scott Forstall | Re: remaining items for sco... | 6/19/03 | 12:43 AM |
| ○ | Stephen O. Lemay | Re: remaining items for sco... | 6/19/03 | 10:45 AM |

FIG. 8

| | | | | | | | | |
|---|---|---|---|---|---|---|---|---|
| ○ ○ ○ | | | | In-christie@apple.com (618 unread) | | | | |
| Compose | Delete | Reply | Reply All | Forward | Mailboxes | Get Mail | Junk | Search "christie@ap... |

5854 messages

| | ○ | From | Subject | Date Recieved |
|---|---|---|---|---|
| | ○ | Scott Forstall | re: remaining items for scott's WWD... | Thu,Jun 19, 2003 12:35 AM |
| ✉ | ○ | Marcel van Os | re: remaining items for scott's WWD... | Thu,Jun 18, 2003 11:44 PM — 808 |
| ↰ | | imran | re: remaining items for scott's WWD... | Thu,Jun 18, 2003 10:43 PM |
| | ○ | Heather M Snow | ice cream today at 4pm! | Thu,Jun 19, 2003 10:24 AM |
| | ○ | Pat Coleman | [Hig] Stopping to have a root canal | Thu,Jun 19, 2003 10:14 AM |
| | ○ | Ali Ozer | Aqua blue colors | Thu,Jun 19, 2003 10:11 AM |
| △ | ○ 1 | Scott Forstall | Sampler icon | Wed,Jun 19, 2003 12:38 AM |
| △ | ○ 2 | Ken Bereskin | Keytone demo feedback | Wed,Jun 18, 2003 11:44 PM |
| △ | ○ 9 | Paul Rekieta | Menu Extra... | Wed,Jun 18, 2003 11:43 PM |
| △ | | designwithinreach@dwr.... | One Word: Plastic | Wed,Jun 18, 2003 8:57 PM |
| | | Pat Coleman | [Hig] Pat out on Friday | Wed,Jun 18, 2003 8:12 PM |
| | | imran | these ones crack me up | Wed,Jun 18, 2003 7:20 PM |
| △ | | Scott Forstall | Search | Wed,Jun 18, 2003 7:17 PM |
| | | imran | look-alike | Wed,Jun 18, 2003 7:13 PM |
| △ | | Patrick McClaughry | unable to mount iDisk disk image w... | Wed,Jun 18, 2003 7:10 PM |

From: Marcel van Os <marcel@apple.com>
Subject: Re: remaining items for scott's WWDC slides
Date: Wednesday, June 18, 2003 11:44:20 PM US/Pacific
To: Greg Christie
Cc: imran@apple.com , slemay@apple.com , bas@apple.com , Heather Snow , Scott Forstall just put the requested files below on the server.

mo
On Wednesday, June 18, 2003, at 07:59 PM, Greg Christie wrote:

FIG. 9

| | | From | Subject | Date Recieved | |
|---|---|---|---|---|---|
| △ | ○ 4 | imran | remaining items for scott's WWDC slides | Today | 11:45 AM |
| △ | ○ 3 | Scott Forstall | Sampler icon | Today | 11:41 AM |
| | ○ | Homeowner Services | Attn: Homeowners – Get Cash Out!.. | Today | 11:32 AM |
| | | adam baker | WWDC 2003 HI Lab Staffing Update | Today | 11:27 AM |
| | ○ | Heather M Snow | ice cream today 4pm! | Today | 10:24 AM |
| | ○ | Pat Coleman | [Hig] Stopping to have a root canal... | Today | 10:14 AM |
| △ | ○ 1 | Ali Ozer | Aqua blue colors | Today | 10:11 AM |
| △ | ○ 9 | Ken Bereskin | Keynote demo feedback | Yesterday | 11:44 PM |
| △ | | Paul Rekieta | Menu Extra.. | Yesterday | 11:43 PM |
| | | designwithinreach@dwr.... | One Word: Plastic | Yesterday | 8:57 PM |
| | | Pat Coleman | [Hig] Pat out on Friday | Yesterday | 8:12 PM |
| | | imran | these ones crack me up | Yesterday | 7:20 PM |
| △ | | Scott Forstall | Search | Yesterday | 7:17 PM |
| | | imran | look-alike | Yesterday | 7:13 PM |
| △ | | Patrick McClaughry | unable to mount iDisk disk image w... | Yesterday | 7:10 PM |

THREADED PRESENTATION OF ELECTRONIC MAIL

COPYRIGHT NOTICE

A portion of this disclosure contains material in which copyright is claimed by the applicant. The applicant does not object to the copying of this material in the course of making copies of the application file or any patents that may issue on the application, but all other rights whatsoever in the copyrighted material are reserved.

BACKGROUND OF THE INVENTION

1. Field of the Invention

The present invention relates generally to the field of presentation of electronic mail. More specifically, the present invention provides an improved access to e-mail display by using threading to organize messages in a user's mailbox.

2. Description of the Related Art

As the amount of e-mail people receive continues to rise almost geometrically, there is an increased need for a way in which to manage that e-mail. When a user receives dozens or even hundreds of e-mails in a single day, the messages become difficult to usefully organize and contextualize. Add to that the occasional vacation, leaving no access to e-mail, and imagine the horror waiting for the user upon his return to find several hundred unread e-mails.

In an effort to help users get a handle on displaying their e-mails, some solutions have already been tried. The most simple example allows a user's inbox to be sorted by one or more various criteria. For example, a user can sort his inbox by message sender, by subject, by date, by file size, or by conversation. Sorting by message sender is helpful because it allows all messages from a single sender to be grouped together in the inbox view. This approach ignores the fact that individual e-mail messages are often part of a chain of messages from different users, forming a discussion. The user therefore loses the context of the conversation. That is, one can see only one side of the conversation. If someone else, including the mailbox user himself has responded to the sender in between two of the sender's messages, that response is lost. Thus, sorting messages merely by message sender is not an adequate solution to the problem of organizing one's inbox. Similarly, organizing messages by received date or by sent date is useful in that it allows messages to be read in the order in which they were received or sent, but does not really give the mailbox owner any context, especially since the user may be participating in multiple conversations at once via e-mail, and there is no grouping of the individual conversations. This problem is addressed partially by the ability to group messages by "conversation", offered by Outlook, a product of Microsoft Corporation of Redmond, Wash. Outlook simply lists messages that are related to a single conversation, even if any message sender subsequently changes the subject line of the message in response to a previous message in that conversation. While this partially addresses the problem, the grouping adds no information about the group itself—it merely organizes the messages to be together in a list in the user's view of the inbox. In addition, all messages become conversations, even where there is only a single message in the conversation. This only adds extra overhead to the already encumbered inbox view. Thus, there is still room for refinement.

In view of the foregoing, a need therefore exists for a way to manage a user's inbox that organizes e-mails in such a way as to provide a thread of messages, including contextual information about the contents of each thread.

SUMMARY OF THE INVENTION

The present invention satisfies the foregoing need by providing a threaded list of messages in a user's mailbox. Each message received is checked to determine whether the new message is associated with one or more previous messages. If the received message is related to a single previous message, then a new thread is created. The new thread has an associated thread header, which stores metadata about the messages in the thread. If the received message is related to messages in an existing thread, then the received message is added to that thread, and the thread header for that thread is updated to reflect data from the received message. The thread headers are persistent data, that are stored in addition to the actual messages themselves. This allows various types of organizational and viewing operations to be performed directly on the thread headers. In a preferred embodiment, the thread header appears along with messages in a message list view of the user's inbox, and provides data about the thread to the user, including the number of messages in the thread, originator of the thread, the subject of the thread, and the time that the thread was most recently updated. Messages that are not part of a thread are preferably shown in the same view as threaded messages, but without a thread header. This allows a user to view both threaded and non-threaded messages in a single view.

BRIEF DESCRIPTION OF THE DRAWINGS

FIG. 6 illustrates a view of a collapsed thread header in a user's inbox in accordance with an embodiment of the present invention.

FIG. 7 illustrates a view of a user's inbox in which a selected thread header is located towards the top of the message index list in accordance with an embodiment of the present invention.

FIG. 8 illustrates a view of the user's inbox in which a thread header has been expanded in accordance with an embodiment of the present invention.

FIG. 9 illustrates a view of the user's inbox in which the threads are sorted by date received.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
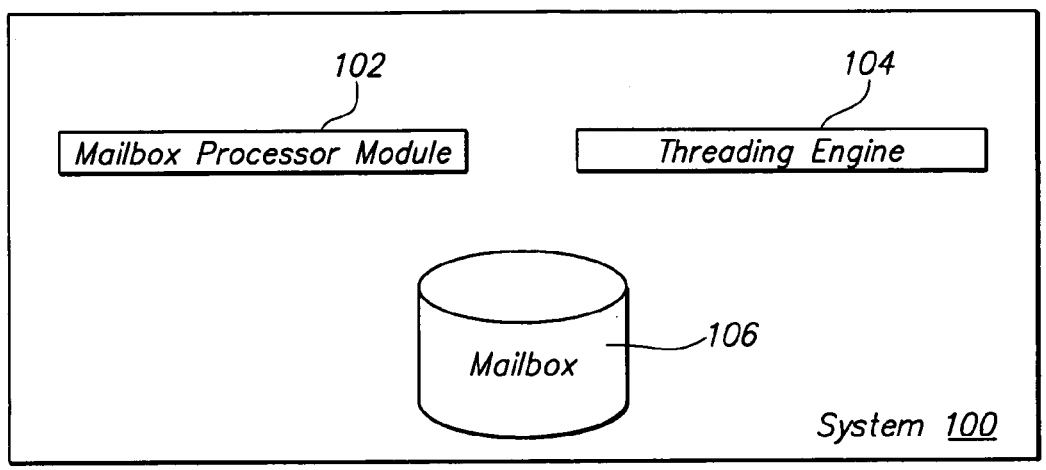
FIG. 1 is a block diagram of a system in accordance with an embodiment of the present invention.

Referring now to FIG. 1, there is shown a block diagram of a system in accordance with an embodiment of the present invention. System 100 includes a mailbox processor module 102 for receiving e-mails; threading engine 104 for organizing and displaying e-mail in a threaded fashion; and mailbox 106 for storing e-mail messages. System 100 can be implemented as part of a general e-mail and/or calendaring and/or contact management solution in a variety of ways, as will be appreciated by those of skill in the art. The system can operate on a user's client computer, on a server computer, or in some combination using both such computers. Those of skill in the art appreciate that the particular implementation and distribution of functionality between various computers is not material to the invention.

An e-mail message (or, simply, "an e-mail") existing on its own is not part of a thread. A thread exists when there are two or more e-mails that bear a relationship to one another. In a preferred embodiment, an e-mail is part of a thread if it is a reply to an earlier message, or a forward of an earlier message. The earlier message is also part of the thread, once the thread comes into being. Note that the e-mails in a thread do not have to be located within a single folder in the user's mailbox. For example, a thread may include messages from the user's sent items folder, personal archive folders; inbox, and other folders used to organize the user's email. Accordingly, though the present invention is described in the context of threads within a single folder, it should be understood that this is for clarity of explanation only, and by no means intended as a limitation of the invention.

One way to determine whether an e-mail is part of a thread is to check whether messages have the same subject. In a preferred embodiment, when a message arrives, threading engine 104 first ignores any subject prefixes (such as RE:, FWD:, etc.) and then compares the remainder of the subject line heading with the subject headings of messages already in the recipient's inbox, here too ignoring their subject line prefixes. Because this method alone is over inclusive (two or more unrelated e-mails can have the same subject), a check is also performed to validate that the message rightfully belongs to the thread. For example, many people send e-mails having the subject "Hello." As a result, there may be many messages in the user's inbox that have the subject "Hello," but are not related to one another. Accordingly, in one embodiment, threading engine 104 checks the "In-Reply-To" field of the header of the incoming message to confirm that it shares the same message ID as an earlier message in the thread. The In-Reply-To SMTP header is a standard field in Internet e-mail as specified by RFC 822. In an alternative embodiment, other headers may be used, such as the message ID header.

When it is determined that a thread exists, threading engine 104 generates a thread header for the thread. A thread header contains information about the thread that it heads, including in one embodiment a sender, a subject, a date, and a number of messages unread in the thread. The thread header is a set of data about the thread that exists independently of the thread itself. Each thread has its own thread header. Threads within mailbox 106 can be sorted and displayed according to any sort criteria found in their respective thread header. For example, if the mailbox is sorted by Subject, then threads will be displayed in ascending or descending lexicographic order according to the subject of the earliest (oldest) message in the thread. If the mailbox is sorted by date, then threads will be displayed in order based upon the date appearing in the thread header, as set forth below.

Figure 2:
FIG. 2 illustrates a view of the user's mailbox prior to activating the threading feature in accordance with an embodiment of the present invention.

FIG. 2 illustrates a view of the user's mailbox prior to activating the threading feature. In the illustrated embodiment of FIG. 2, the main view is split into two sub parts: a list 220 of email messages, and a content view 218 of the contents of either a message or thread selected in the list 220. Message list 220 includes a "From" column 202, a Subject column 204, and a Date Received column 206. Each of these columns is one that can be sorted on, and in the illustrated embodiment, Date Received 206 is the column being sorted on. Accordingly, each of the messages listed is sorted in the order in which it was received. A message that is currently being viewed is highlighted in list 220 in a preferred embodiment, and displayed in content view 218. In FIG. 2, message 208 is being viewed, and is from Scott Forstall, with the subject "Sampler Icon", and was received Wednesday, Jun. 18, 2003 at 11:01 PM. The text of message 208 is displayed in content view 218.

Although messages in this view are not threaded, it is apparent from a review of inbox window 220 that some of the other messages are related to message 208. For example, messages 210, 212, 214, and 216 each have the subject "Sampler Icon." Accordingly, in a threaded view, we would expect to see these messages grouped together.

Figure 3:
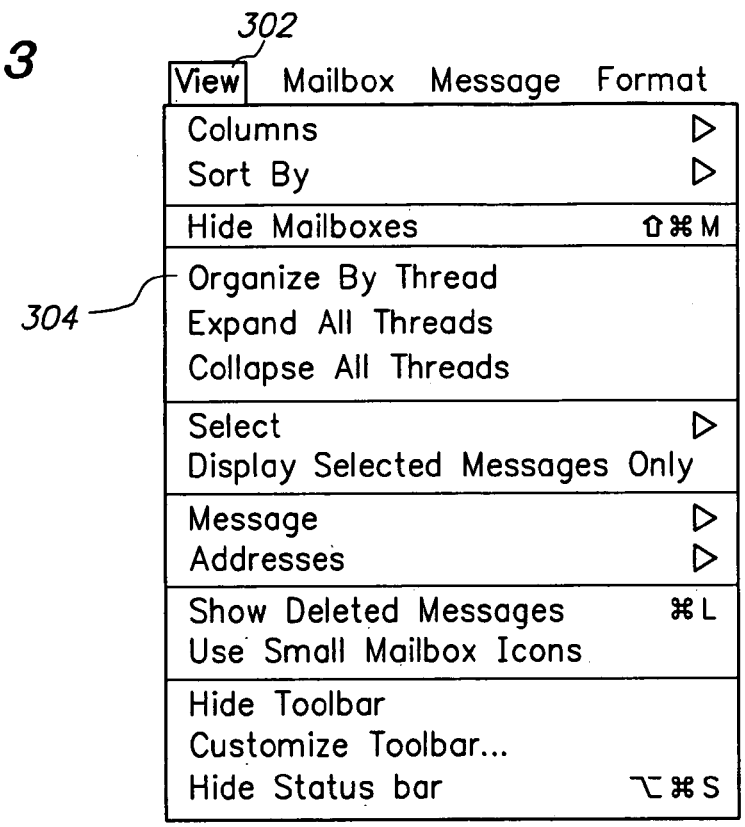
FIGS. 3 and 4 illustrate the selection of an "Organize by Thread" option in accordance with an embodiment of the present invention.
Figure 4:
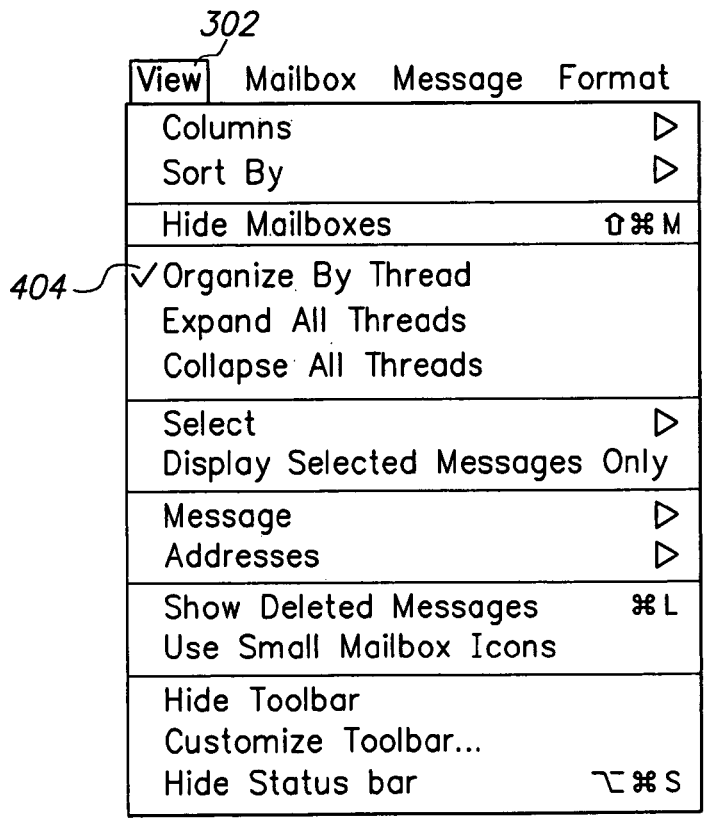

FIG. 3 shows how an option 304 can be selected from a menu such as View menu 302 to turn on "Organize by Thread." FIG. 4 illustrates that in one embodiment when the Organize by Thread option 402 is selected, a check mark appears next to the item in the menu 302.

Figure 5:
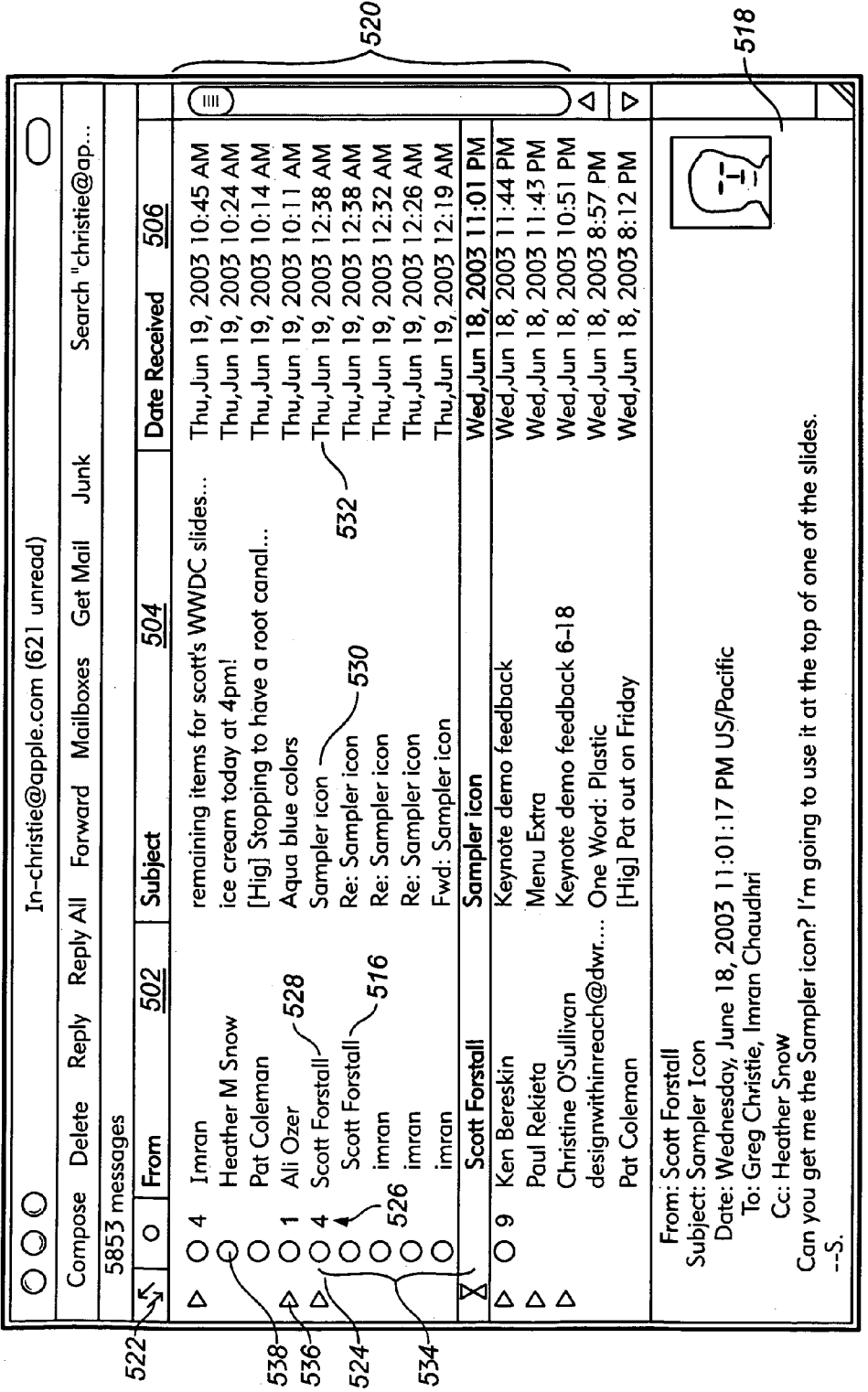
FIG. 5 illustrates an example view of a user's inbox with threading turned on in accordance with an embodiment of the present invention.

Referring now to FIG. 5 there is shown an example view of a user's inbox with threading turned on. Again, the view is split into two panels: the message listing 520, and the content view 518 of a single message. In message listing 520, there are again three columns: a "From" column 502, "Subject" column 504, and "Date Received" column 506. In the illustrated embodiment, sorting is again being done on the Date Received 506 column. When threading is turned on, a thread column 522 is also displayed in a preferred embodiment. Tbe presence of an arrow in the thread column 522 pointing either to the right or down in indicates the beginning of a thread, and the line on which the arrow appears contains data from the thread header for the thread. Header 524 is one example of a thread header. Like a message line, header 524 includes From. Subject and Date Received data. Since the thread header is intended to give information to the user about the contents of the thread, contextual information from the thread is included in the header 524. For example, the From entry 528 provides the name of the person who started the thread. The Subject 530 in the thread header 524 is the original subject of the thread. The Date Received 532 entry is the date on which the most recent message in the thread was received. In alternative embodiments, other criteria could be used for the thread header. For example, the From entry could reflect the name of the person who most recently sent a message in the thread, instead of the person who originated the thread. Similarly, the subject entry could be the subject of the message as changed by one of the forwarders or respondents in the thread, or it could be the originating subject; and the Date Received could be the date on which the first message was received in the thread, instead of the most recent message. Other modifications could also be made as will be readily appreciated by those of skill in the art. Appropriately, the five messages 208, 210, 212, 214 and 216 (FIG. 2) referred to above as belonging to a single conversation have now been grouped into a single thread 534. Each of the messages in the thread has the subject "Sampler Icon," and some of the subjects are preceded by subject prefixes such as "Re:" and "Fwd." The most recent message 516 was received Thursday June 19, 2003 at 12:38 AM, from Scott Forstall. This information is extracted and appears again in the thread header 524. Thread header 524 also includes a number of unread messages 526. In the case of the illustrated header 524, there are four unread messages in the thread. In a preferred embodiment, thread headers can be either expanded or collapsed. When a thread is collapsed, the arrow in column 522 points to the right, as is standard to indicate collapsed data. An example is the thread 536 from Ali Ozer. When expanded, the arrow points down, and the messages within the expanded thread are shown with the From data indented to help the user identify the messages as belonging to the thread. Using threads only where there are two or more related emails avoids the unnecessary clutter that would otherwise result if a single email was designated as a thread: if a thread header, such as header 524 was displayed for each individual message, then the user would expand the header only to find a single email. This only wastes the user's time, as there is no more useful information in the thread header than in the single email itself.

In one embodiment messages within a thread are displayed against a colored background to separate them from other threads, or from messages not within any thread. For example, message 538 from Heather M. Snow with Subject "Ice cream today at 4 pm" is not within a thread. It is preferably displayed against a white or plain background. On the other hand, messages within thread 534 are displayed against a light blue background; thread header 524 is displayed against a darker background; and the message currently being viewed 508 is displayed against a high contrast background. Those of skill in the art will recognize that the particular colors or shades of colors used are not material to the present invention, and that any suitable manner of demarcating threads can be used.

Figure 6:
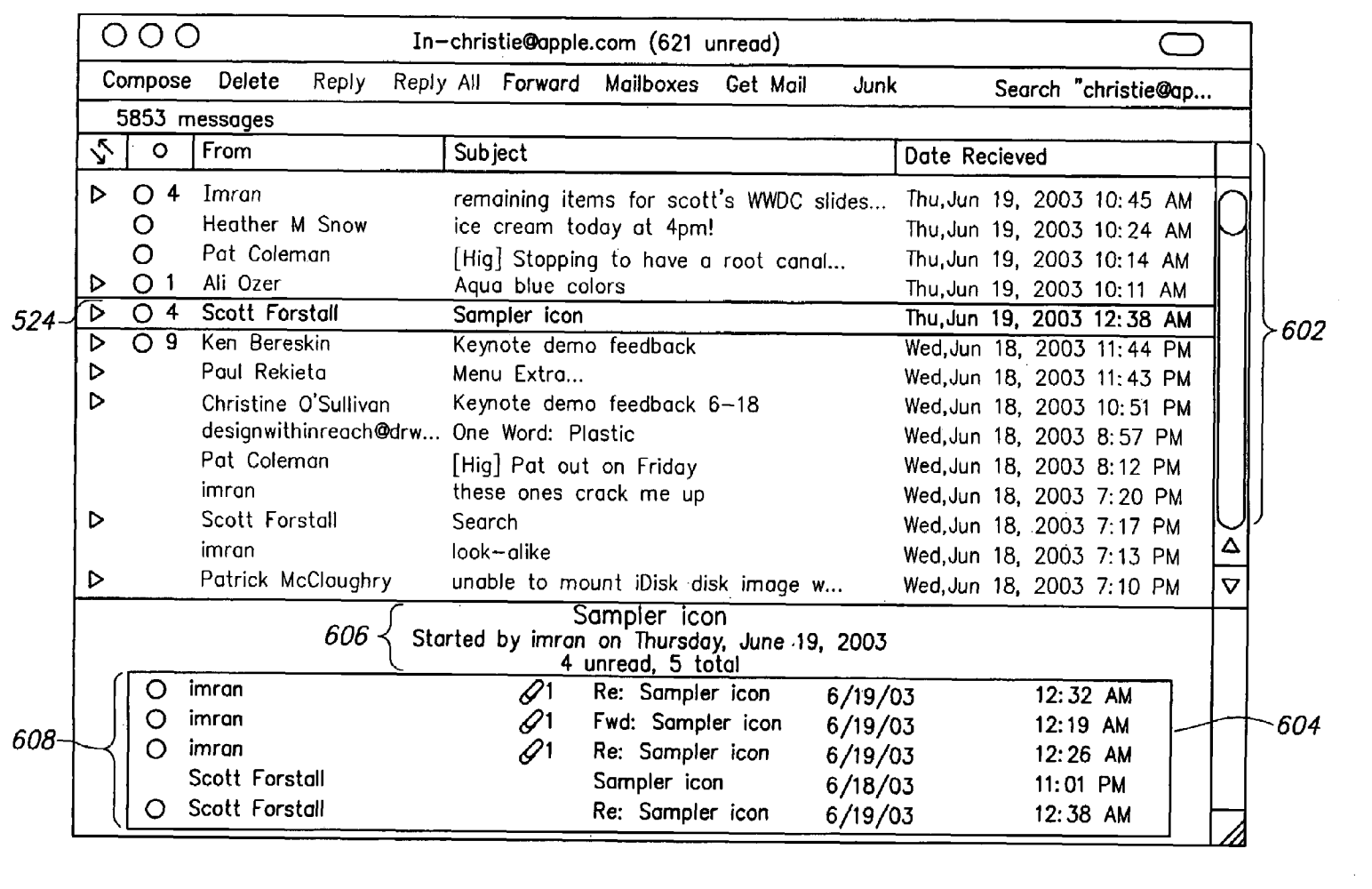

FIG. 6 shows thread header 524 in a collapsed mode, where only the header itself is visible in the message list area 602, and none of the messages within the thread is visible. However, in a preferred embodiment when the collapsed header is selected in the message listing area 602, content view area 604 shows the details of the thread header 606 and a list 608 of all the messages in that thread. Details of the thread header 606 include in a preferred embodiment the title of the thread, which is the original subject of the thread, the originator of the thread, and the time at which the thread was started, and the number of messages and unread messages in the thread. List 608 indicates for each of the messages in the thread its status (read, unread, attachments, dates, times, subjects, etc.). Selecting one of the messages from the list 608 expands the thread in the messages listing area 602 and displays the message that was selected.

FIG. 7 illustrates a view in which the selected thread header 702 is located towards the top of the message index list 704. When this thread is expanded to reveal its contents, highlighted bar 706 remains in the same position relative to the index screen 704, and the thread expands above and below the bar, showing the emails in the thread that are prior to the selected email (based on the current sort order) above the selected email, and those emails in the thread that are after the selected email below it. This preserves the visual context for the user by keeping the highlighted bar 706 consistently located in the same position in the view. This is illustrated further with reference to FIG. 8, in which the thread has been expanded to reveal a message from Marcel van Os 808 located in the same position as the thread header 702 was previously located. In one embodiment, when messages belonging to a single thread are located in different folders, opening the thread header in any one folder brings all the messages together to be viewed. Collapsing the thread restores the messages to their original location.

When a new message arrives, threading engine 104 examines the subject and In-Reply-To fields of the message header to determine whether the message is related to any other messages already in the user's mailbox. Alternatively, the threading engine 104 may use just the In-Reply-To field to determine the existence of a thread. If the message is so related, and if a thread header has previously been created (i.e. there are already at least two related messages in the user's mailbox), the current message is added to the existing thread. Alternatively, if the message is related to another message, but a thread does not yet exist, a thread header is created for the new thread. The thread header information is updated, for example, to store the sender information for the most recent message, an updated count of the messages in the thread, the time of the most recent message, and any other attributes or fields that may be usefully included in the summary information of the thread header. The message inbox view is then adjusted as necessary, depending on its sort criteria. For example, if the message inbox is sorted according to Date Received, and the thread header indicates the date received of the most recent message, then when a new message arrives, the thread containing the new message will become the first message thread in the message list, if the list is in descending order of date received. This is illustrated further with respect to FIG. 9, in which a message has just arrived in the "remaining items for scott's WWDC slides" thread. Accordingly, that thread 904 is moved to the top of the message inbox list 902, since the date received category is being sorted on in descending order.

In one embodiment, when a user expands a thread, the oldest unread message in the expanded thread is automatically highlighted. One implication of this is that if a user reads a message, collapses the thread, and then re-expands the thread, he is automatically shown the next unread message in the thread. This enables the user to review a some of the messages in a thread, close the thread, and then return to it later, and immediately pick up the review where he left off, without having to remember which was the last message reviewed.

In one embodiment, mailbox processor module 104 supports attribute-based color coding of messages, in which messages having certain attributes are automatically colored a certain color. In particular, one attribute for color coding is the message sender, so that all messages from a given sender have the same color. When threading is activated, the color of a thread takes on the color, if any, of the sender who initiated the thread. In an alternative embodiment, the color of the thread is the color associated with the sender who sent the most recent e-mail in the thread. This allows the user to tell from the thread header who has most recently added a message to the thread. In another embodiment, each sender may have an associated priority value. In this case, the color of the thread will be the color of the sender of a message in the thread having the highest priority.

Figure 10:
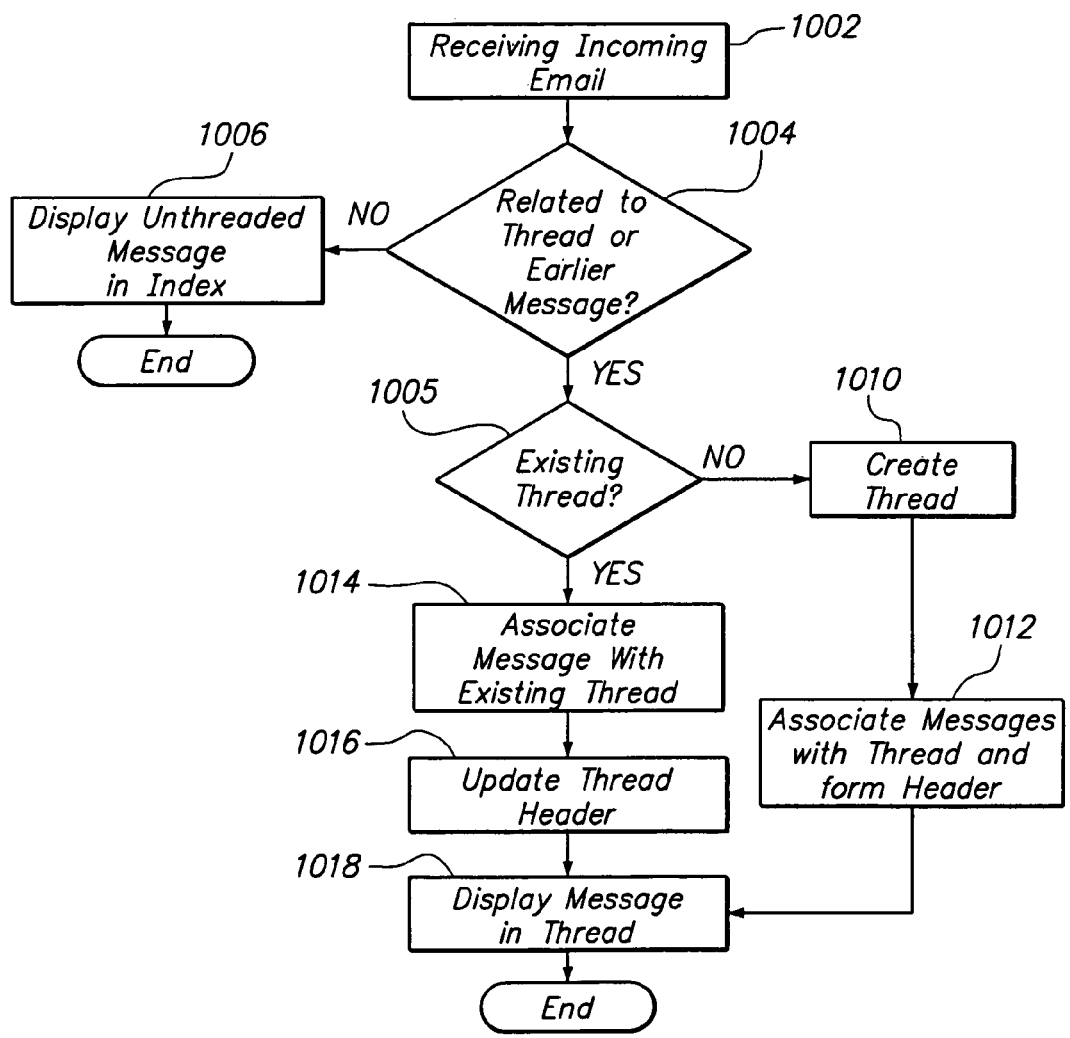
FIG. 10 is a flowchart illustrating a method of threading e-mail in accordance with an embodiment of the present invention.

Referring now to FIG. 10, there is shown a flowchart of a method in accordance with an embodiment of the present invention. When an e-mail is received 1002 by mailbox processor module 102, threading engine 104 first determines 1004 whether the e-mail is related to either an existing thread or an earlier single message. If the message is not related to an existing thread or earlier message, no more threading is necessary for that message, and it is displayed 1006 in an unthreaded fashion in the mailbox index. If the message is part 1005 of an existing thread, then threading engine 104 associates 1014 the message with the existing thread. If the message is related to an earlier single message but there is no existing thread, threading engine 104 creates 1010 a new thread header for the new thread, and associates 1012 both the earlier message and the current message with the new thread. Next, threading engine 104 updates 1016 the thread header with information gleaned from the incoming message. For example, in a preferred embodiment, the thread header is updated to have as its Date Received information the Date Received of the most recent e-mail in the thread. Finally, the message is displayed 1018 in the thread.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the threading engine 104 and so forth may be provided in many or one module.

Some portions of the above description present the feature of the present invention in terms of algorithms and symbolic representations of operations on information. These algorithmic descriptions and representations are the means used by those skilled in the e-mail management arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A system for threading e-mail messages, comprising:
a mailbox processor module for receiving e-mail messages including a first e-mail message and a second e-mail message;
a mailbox, communicatively coupled to the mailbox processor module, for electronically storing the received e-mail messages;
a threading engine, communicatively coupled to the mailbox processor module, for:
determining that the first received e-mail message is related to the second e-mail message, the second e-mail message received subsequent to the first e-mail message;
creating an e-mail thread if the first e-mail message is related to the second e-mail message;
associating the e-mail thread with the first e-mail message and the second e-mail message, the e-mail thread additionally including a thread header, the thread header having e-mail thread information derived from attributes of at least one of the first or second e-mail messages; and
a display device operable to display information about one or more received e-mail messages in a user interface including displaying information from at least one unthreaded e-mail message and thread header information, the displayed thread header information being distinct from information displayed for individual e-mail messages and where the thread header information is displayed in the mailbox in place of mailbox entries for the first e-mail message and the second e-mail message associated with the e-mail thread.

2. The system of claim 1 wherein the threading engine additionally updates the thread header associated with the e-mail thread.

3. The system of claim 2 wherein the thread header includes a subject of the e-mail thread.

4. The system of claim 2 wherein the thread header includes an originator of the e-mail thread.

5. The system of claim 2 wherein the thread header includes indicia of the number of messages in the e-mail thread.

6. The system of claim 2 wherein the thread header includes a time that the e-mail thread was most recently updated.

7. The system of claim 1 wherein the threading engine is further configured for:
receiving a third e-mail message;
determining that the third e-mail message is related to the e-mail thread;
associating the third e-mail message with the e-mail thread; and
updating the thread header to include information derived from attributes of the third e-mail message.

8. A method for threading e-mail messages, comprising:
receiving a first e-mail message;
receiving a second e-mail message subsequent to the first e-mail message;
determining that the first e-mail message is related to a second e-mail message;
creating an e-mail thread if the second e-mail message is related to the first e-mail message;
associating the e-mail thread with the first e-mail message and the second e-mail message, the e-mail thread including a persistent thread header, the thread header having e-mail thread information derived from attributes of at least one of the first or second e-mail messages; and
displaying information from at least one unthreaded e-mail message and thread header information in a user interface where the thread header information is displayed in a mailbox in lieu of information for individual e-mail messages associated with the e-mail thread.

9. The method of claim 8 wherein the persistent thread header includes a subject of the e-mail thread.

10. The method of claim 8 wherein the persistent thread header includes an originator of the e-mail thread.

11. The method of claim 8 wherein the persistent thread header includes indicia of the number of messages in the thread.

12. The method of claim 8 wherein the persistent thread header includes a time that the e-mail thread was most recently updated.

13. The method of claim 8 further comprising:
receiving a third e-mail message;
determining that the third e-mail message is related to the e-mail thread;
associating the third e-mail message with the e-mail thread; and
updating the thread header to include information derived from attributes of the third e-mail message.

14. The method of claim 8 wherein the displayed thread header information includes displaying a color associated with a sender of the first e-mail message.

15. The method of claim 8 wherein the displayed thread header information includes displaying a color associated with a sender of the second e-mail message.

16. The method of claim 8 wherein each sender of an e-mail has an associated priority, and the displayed thread header information is displayed in a color associated with a sender having the highest priority.

17. The method of claim 8 further comprising displaying an expansion icon associated with the thread header in the user interface.

18. The method of claim 17 further comprising:
responsive to a selection of the expansion icon, displaying information about each individual e-mail message associated with the e-mail thread in the user interface.

19. The method of claim 18 further comprising highlighting for selection an oldest unread e-mail message associated with the e-mail thread.

20. The method of claim 18 wherein e-mail messages associated with the e-mail thread are displayed in a common color.

21. The method of claim 8 wherein the second e-mail message is related to the first e-mail message if it is a reply to the first e-mail message.

22. The method of claim 8 wherein the second e-mail message is a reply to the first e-mail message if a In-Reply-To field of a header of the second e-mail message identifies the first e-mail message.

23. The method of claim 8 wherein the second e-mail message is related to the first e-mail message if it includes a forward of the first e-mail message.

24. The method of claim 8 wherein the first e-mail message and the second e-mail message are stored in different folders of a user's mailbox.

25. The method of claim 24 wherein at least one of the e-mail messages is stored in the user's sent items folder.

26. The method of claim 24 wherein at least one of the e-mail messages is stored in the user's personal items folder.

27. A computer program product for threading e-mail messages, the program product stored on a computer readable storage medium and adapted to perform the operations of:
receiving a first e-mail message;
receiving a second e-mail message subsequent to the first e-mail message;
determining that the first e-mail message is related to a second e-mail message;
creating an e-mail thread if the second e-mail message is related to the first e-mail message;
associating the e-mail thread with the first e-mail message and the second e-mail message, the e-mail thread including a thread header, the thread header having e-mail thread information derived from attributes of at least one of the e-mail messages; and
displaying information from at least one unthreaded e-mail message and thread header information in a user interface where the information from the at least one unthreaded e-mail message and the thread header information is displayed in a mailbox, the displayed thread header information being distinct from information displayed for individual e-mail messages and where the thread header information is displayed in place of the information for each e-mail message associated with the e-mail thread.

28. The computer program product of claim 27, further adapted for:
receiving a third e-mail message;
determining that the third e-mail message is related to the e-mail thread;
associating the third e-mail message with the e-mail thread; and
updating the thread header to include information derived from attributes of the third e-mail message.

29. The computer program product of claim 27 wherein the thread header includes a subject of the e-mail thread.

30. The computer program product of claim 27 wherein the thread header includes an originator of the e-mail thread.

31. The computer program product of claim 27 wherein the thread header includes indicia of the number of messages in e-mail thread.

32. The computer program product of claim 27 wherein the thread header includes a time that the e-mail thread was most recently updated.

33. A system for threading e-mail messages, comprising:
receiving means, for receiving a first e-mail and a second e-mail message;
determining means, communicatively coupled to the receiving means, for determining that the first e-mail message is related to a second e-mail message, the second e-mail message received subsequent to the first e-mail message;
creating means, communicatively coupled to the determining means, for creating an e-mail thread if the first e-mail message is related to the second e-mail message; and
associating means, communicatively coupled to the creating means, for associating the e-mail thread with the first e-mail message and the second e-mail message, the e-mail thread additionally including a thread header, the thread header having e-mail thread information derived from attributes of at least one of the e-mail messages; and
a display device operable to display information about one or more received e-mail messages in a user interface including displaying information from at least one unthreaded e-mail message and thread header information as entries in a mailbox and where the thread header information is displayed in place of mailbox entries for each e-mail message associated with the e-mail thread.

34. The system of claim 33, wherein:
the receiving means are further configured to receive a third e-mail message;
the determining means are further configured to determine that the third e-mail message is related to the e-mail thread; and
the associating means are further configured to associate the third e-mail message with the e-mail thread and to update the persistent thread header to include information derived from the attributes of the third e-mail message.

35. A method for threading e-mail messages, comprising:
receiving a first e-mail message;
receiving a second e-mail message that is related to the first e-mail message; and
threading the first e-mail message and the second e-mail message, the threading including:
creating an e-mail thread having a thread header, the thread header having e-mail thread information derived from attributes of at least one of the first or second e-mail messages; and
displaying information from one or more unthreaded e-mail messages and the thread header as respective entries in a mailbox.

36. The method of claim 35, further comprising:
receiving a third e-mail message related to either the first e-mail message or the second e-mail message; and
updating the thread including updating the displayed thread header.

37. A method for threading e-mail messages, comprising:
receiving a first e-mail message;
receiving a second e-mail message related to the first e-mail message; and
threading the first e-mail and the second e-mail, the threading including displaying a display item indicating a nature of the relationship between the first e-mail message and the second e-mail message and where the display item is displayed in a mailbox in place of mailbox entries for the first e-mail message and the second e-mail message, where information from at least one unthreaded e-mail message is displayed in the mailbox.

38. A method for threading e-mail messages, comprising:
receiving a first e-mail message;
receiving a second e-mail message subsequent to the first e-mail message;
determining that the first e-mail message is related to a second e-mail message, where determining if the first e-mail message is related to the second e-mail message includes:
identifying whether a subject field of the first e-mail message and the subject field of the second e-mail message include common data, and
if the subject field includes common data, determining whether the second e-mail message includes a message identifier included in the first e-mail message;
creating an e-mail thread if the second e-mail message is related to the first e-mail message;
associating the e-mail thread with the first e-mail message and the second e-mail message, the e-mail thread including a thread header, the thread header having thread information derived from attributes of at least one of the first or second e-mail messages; and
displaying information from at least one unthreaded e-mail message and thread header information in a user interface.

39. The method of claim 38, where determining whether the subject field includes common data includes disregarding subject prefixes.

40. A method comprising:
receiving a first e-mail message and a second e-mail message;
determining that the first e-mail message is related to the second e-mail message;
creating an e-mail thread associated with the first e-mail message and the second e-mail message;
displaying information from one or more unthreaded e-mail messages and a thread header as respective entries in a mailbox, the thread header being displayed in place of entries in the mailbox for the first e-mail message and the second e-mail message.

* * * * *

UNITED STATES PATENT AND TRADEMARK OFFICE
CERTIFICATE OF CORRECTION

PATENT NO. : 7,421,690 B2  Page 1 of 1
APPLICATION NO. : 10/602335
DATED : September 2, 2008
INVENTOR(S) : Scott Forstall, Gregory N. Christie and Steve Lemay It is certified that error appears in the above-identified patent and that said Letters Patent is hereby corrected as shown below:

On the Title Page, Item (57)

In the Abstract, at Line 5; replace:
"has an associated thread header, which stores metadata bout" with
-- has an associated thread header, which stores metadata about --

Column 10, Line 2 at Claim 22; replace:
"message is a reply to the first e-mail message if a In-Reply-To" with
-- message is a reply to the first e-mail message if an In-Reply-To --

Column 11, Line 10 at Claim 34; replace:
"derived from the attributes of the third e-mail" with
-- derived from attributes of the third e-mail --

Signed and Sealed this

Seventeenth Day of February, 2009

JOHN DOLL
*Acting Director of the United States Patent and Trademark Office*